(12) United States Patent
Kowal et al.

(10) Patent No.: US 8,604,833 B2
(45) Date of Patent: Dec. 10, 2013

(54) INTEGRATED CIRCUIT DEVICE AND METHOD OF USING COMBINATORIAL LOGIC IN A DATA PROCESSING CIRCUIT

(75) Inventors: Shai Kowal, Ramat Gan (IL); Assaf Babay, Modi'in (IL); Ilan Cohen, Elad (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/574,889

(22) PCT Filed: Jan. 26, 2010

(86) PCT No.: PCT/IB2010/050337
§ 371 (c)(1),
(2), (4) Date: Jul. 24, 2012

(87) PCT Pub. No.: WO2011/092548
PCT Pub. Date: Aug. 4, 2011

(65) Prior Publication Data
US 2012/0293205 A1   Nov. 22, 2012

(51) Int. Cl.
*H03K 19/00* (2006.01)
*H03K 19/173* (2006.01)
*G06F 1/00* (2006.01)

(52) U.S. Cl.
USPC ................................ 326/93; 326/46; 713/322

(58) Field of Classification Search
USPC ................... 326/93, 95, 37–41; 713/320, 330
See application file for complete search history.

(56) References Cited

U.S. PATENT DOCUMENTS

| 5,189,320 | A | 2/1993 | Gongwer |
| 5,646,555 | A | 7/1997 | Morinaka |
| 5,787,273 | A * | 7/1998 | Runaldue ...................... 713/500 |
| 6,708,139 | B2 * | 3/2004 | Rearick et al. ................ 702/185 |
| 8,438,442 | B2 * | 5/2013 | Morrison ....................... 714/742 |
| 2003/0142774 | A1 | 7/2003 | Takasoh et al. |
| 2007/0165759 | A1 | 7/2007 | Whetsel |
| 2008/0143383 | A1 * | 6/2008 | Wong .............................. 326/46 |
| 2008/0186983 | A1 | 8/2008 | Dielissen et al. |
| 2009/0066546 | A1 | 3/2009 | Yonezawa et al. |
| 2010/0153759 | A1 * | 6/2010 | Singhal ......................... 713/322 |

OTHER PUBLICATIONS

International Search Report and Written Opinion correlating to PCT/IB2010/050337 dated Oct. 19, 2010.

* cited by examiner

*Primary Examiner* — Shawki Ismail
*Assistant Examiner* — Dylan White

(57) ABSTRACT

An integrated circuit device comprising one or more data processing circuits, each having an input stage, a combinatorial logic stage and an output stage. The input stage is responsive to a clock signal, and receives at least a first and second set of data signals and provides the first set to an input of the logic stage during a first portion of a clock signal period, and provides the second set to the input during a second portion of the period. The output stage is responsive to the clock signal, and receives from an output of the logic stage at least a first result signal as a function of the first set during a first portion of a subsequent clock signal period and receives from the output at least a second result signal as a function of the second set during a second portion of the subsequent period.

20 Claims, 4 Drawing Sheets

- PRIOR ART -

INTEGRATED CIRCUIT DEVICE AND METHOD OF USING COMBINATORIAL LOGIC IN A DATA PROCESSING CIRCUIT

FIELD OF THE INVENTION

This invention relates to an integrated circuit device and a method of using combinatorial logic in a data processing circuit.

BACKGROUND OF THE INVENTION

A logic circuit performs a logical operation on one or more logic inputs and produces a logic output. The logic normally performed in digital circuits is Boolean logic and for example logic gates such as AND, OR, NOR, XOR gates, just to name a few, are primarily implemented in integrated circuits using diodes or transistors. In electronic logic, a logic level is represented by a voltage or current, depending on the type of electronic logic in use. Each logic circuit requires power so that it can source and sink currents to achieve the correct output voltage.

Logic circuitry can for example be implemented as combinatorial, that is combinational, or as sequential logic circuitry. Sequential logic is a type of logic circuit whose output depends not only on the present input but also on the history of the input. This is in contrast to combinational logic, whose output is a function only of the present input. Therefore, sequential logic requires some memory while combinatorial logic does not contain memory elements. In other words, combinatorial logic circuits may be any Boolean circuits where the output is a function of the present input only, without any memory of a previous state.

In a clocked integrated circuit design, a circuit portion consisting of combinatorial circuitry may not receive a clock signal. However, input of data signals and output of corresponding result signals may be implemented using clocked devices such as flip-flops receiving a clock signal.

For combinatorial logic circuitry within a clocked integrated circuit design, data signals are usually applied to the combinatorial logic by means of flip-flop circuits or other types of registers responsive to a rising or positive edge of a clock signal. Other designs may for example use circuits responsive to a falling or negative edge of the clock signal. The signal or signals then propagate through the combinatorial logic circuit (or "logic cloud") which performs some logic action on the received input signal and outputs a result signal which is a function of the input signal. The result signal is sampled at the next positive clock edge for example by a destination flip-flop for further processing.

Generally, a signal is any time-varying quantity, for example a current or voltage level that may vary over time. Here, data signal and result signal may especially refer to signals carrying a representation of an information, usually a digital representation, for example binary encoded. It should be noted that time-variation of a quantity may include zero variation over time. For example, a signal may comprise a constant voltage level.

According to Moore's law, the performance of very large scale integrated (VLSI) circuit designs doubles approximately every two years. This can for example be achieved by increasing the integrated circuit die size and applying more power to the integrated circuit for doubling the amount of logic circuits or, if possible, doubling the clock frequency applied to the circuit. As schematically shown in FIG. 1, a common way of increasing performance of a data processing circuit of an integrated circuit device which performs logic action using combinatorial logic is to allow for doubling performance by doubling the combinatorial logic circuitry 10, 12 used and associated source flip-flop circuits 14, 16 and destination flip-flop circuits 18, 20, responsive to or triggered by a clock signal generated by a clock signal generator 22, for providing data signals to and receiving result signals from the logic circuit 10, 12.

SUMMARY OF THE INVENTION

The present invention provides an integrated circuit device and a method of using combinatorial logic in a data processing circuit as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
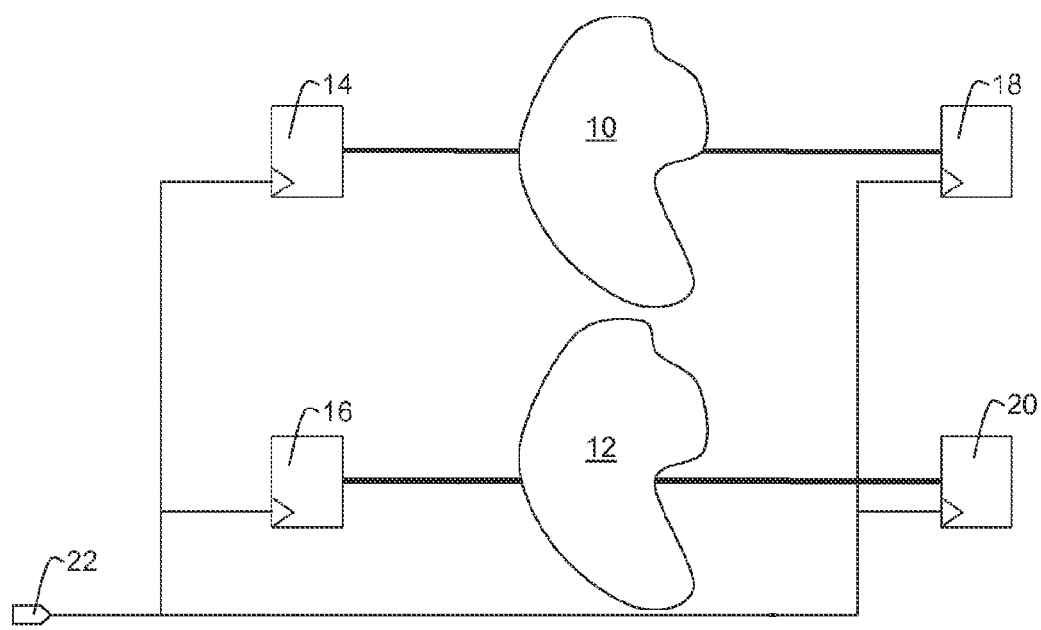
FIG. 1 schematically shows a prior art integrated circuit device, with doubled circuitry.
Figure 2:
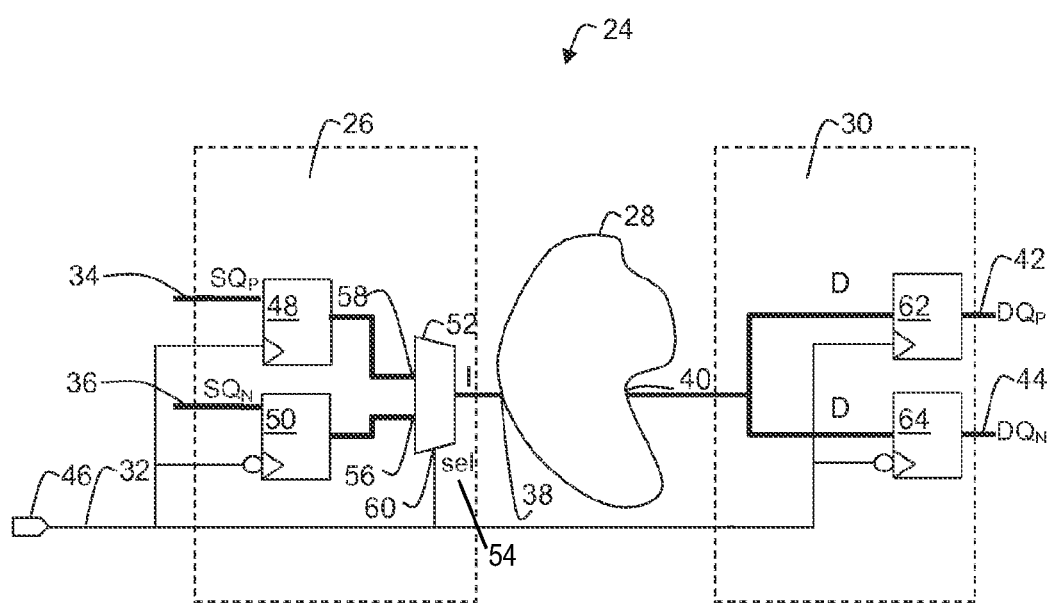
FIG. 2 schematically shows an example of an embodiment of an integrated circuit device comprising a data processing circuit.
Figure 3:
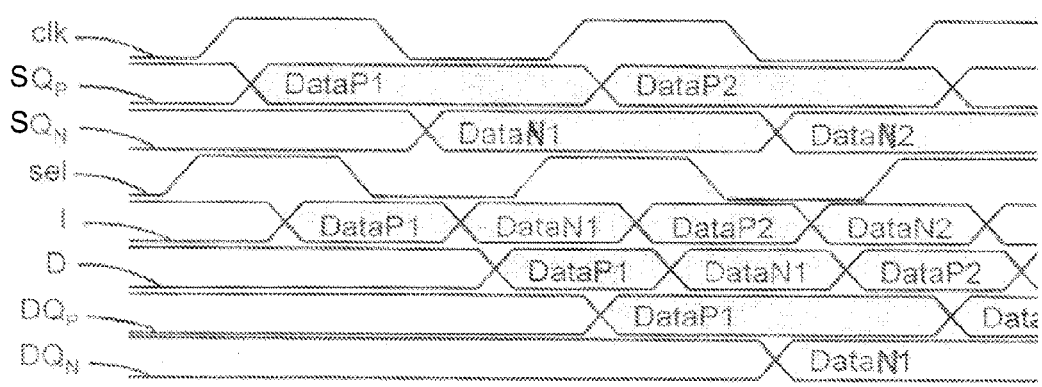
FIG. 3 schematically shows a timing diagram according to an example operation of an embodiment of the integrated circuit device.

Referring to FIG. 2, an example of an embodiment of an integrated circuit device 24 comprising a data processing circuit 26, 28, 30 for performing logic action on input data signals is schematically shown. Referring also to FIG. 3, a timing diagram according to an example operation of an embodiment of the integrated circuit device 24 is schematically shown.

The integrated circuit device 24 may comprise one or more data processing circuits, each comprising an input stage 26, a combinatorial logic stage 28 and an output stage 30. The input stage 26 may be responsive to a clock signal (clk) 32, and arranged to receive at least a first set 34 and a second set 36 of data signals $SQ_P$ resp. $SQ_N$ and to provide the first set 34 of data signals $SQ_P$ to an input 38 of the combinatorial logic stage 28 during a first portion of a period of the clock signal and to provide the second set 36 of data signals $SQ_N$ to the input 38 during a second portion of the period. The output stage 30 may be responsive to the clock signal (clk) 32, and arranged to receive from an output 40 of the combinatorial logic stage 28 at least a first result signal ($DQ_P$) 42 as a function of the first set 34 of data signals $SQ_P$ during a first portion of a subsequent period of the clock signal (clk) 32 and to receive from the output at least a second result signal ($DQ_N$) 44 as a function of the second set 36 of data signals $SQ_N$ during a second portion of the subsequent period.

This may allow for performance increase by resource sharing of the combinatorial logic circuitry 28 between first and second sets 34,36 of input data signals. In the shown example, the complete combinatorial logic circuitry 28 is shared. However, it will be apparent that, in another embodiment of the integrated circuit device 24, only parts of the combinatorial logic circuitry 28 may be shared.

Usage of the combinatorial logic circuitry 28 for processing first and second sets of data signals within a period of time during which a prior art device providing a combinatorial logic circuitry of the same structure as circuitry 28 may for example only process the first set of data signals, may allow for performance increase of the integrated circuit device 24 over the prior art device, for example in terms of overall processing speed or throughput. Also, the same or similar performance may be achieved using smaller combinatorial logic circuitry 28, for example comprising less logic gates or other circuits. This may for example allow for die area savings when implementing the integrated circuit device 24. Furthermore, it may allow for reduced power consumption of the device 24. The presented integrated circuit device 24 may for example allow for performance increase, power savings or die area reduction or a combination of some or all of these advantages.

The clock signal (clk) 32 may be provided by a clock signal generator 46. The clock signal may for example be a square wave signal. An ideal square wave alternates regularly and instantaneously between two levels. However, the clock signal may comprise any other waveform, such as the one shown in FIG. 3, suitable to clock the input stage 26 and the output stage 30 by triggering state changes of circuits responsive to the clock signal.

A set of data signals may comprise one or more than one data signals available within the same clock cycle. The input 38 of the combinatorial logic stage 28 may refer to a single terminal or to a plurality of terminals for example for receiving each signal of the first or the second set of input data signals in parallel. The output 40 of the combinatorial logic stage 28 may be a shared output for the first and the second result signal and the output signal D may comprise a sequence of first and second result signals.

Here, a data signal and a result signal may be referred to as a part in a sequence of data signals and result signals having a duration of a cycle of the clock signal (clk) 32, which can be regarded as a sequence of clock cycles.

The combinatorial logic stage 28 may comprise only combinatorial logic circuits.

The example embodiment shown in FIG. 2 may allow for utilizing the same combinatorial logic 28 twice during each period or cycle of the clock signal (clk) 32. As shown in FIG. 3, the signals may propagate through the logic stage 28 in a pipeline manner I, D. First and second set of data signals may be applied to the combinatorial logic stage 28 alternately and result signals 42 $DQ_P$, 44 $DQ_N$ computed as a function of the corresponding set of input data signals 34 $SQ_P$, 36 $SQ_N$, that is depending on the corresponding input data signals, may be output alternately during a subsequent period of the clock signal.

As shown in FIG. 3, first 34 $SQ_P$ and second 36 $SQ_N$ sets of data signals may arrive at the input stage at a rate corresponding to a clock frequency and first result signals ($DQ_P$) 42 and second result signals ($DQ_N$) 44 may be provided by the output stage 30 to other units of the integrated circuit 24 at the same rate, although the not clocked combinatorial logic stage 28 may process data I, D at double the rate, i.e. receive input data I at input 38 and provide result data D. This may be achieved without doubling clock frequency or providing a second clock signal with an increased clock frequency.

A subsequent period of the clock signal may be the next clock period. However, in certain devices the combinatorial logic stage 28 may introduce a signal propagation delay of more than one clock cycle or period between the period of data signal introduction into the combinatorial logic stage 28 and output of the corresponding result signal during the subsequent period.

In an embodiment of the integrated circuit device 24, complexity of the combinatorial logic stage may be chosen to ensure delay between application of a data signal to the input 38 and presence of the corresponding result signal at the output 40 of the combinatorial logic stage 28 of not more than one clock cycle.

Providing a set of data signals during a portion a clock signal period may comprise that the signal or a particular signal level may be present during all or at least part, e.g. due to delay, of the duration of the portion of the clock signal period. A portion of a clock signal period may be half of the clock period. However, a portion may have a duration of less or more than half of the duration of a clock signal period.

Utilizing the combinatorial logic stage 28 shown in FIG. 2 more than once during each clock cycle may be more efficient and may allow for at least increased performance, for example doubled performance, while keeping a frequency of the clock signal (clk) 32 constant compared to an integrated circuit using all portions of a period of the clock signal for one data signal. The clock dynamic power consumption may increase only slightly, since the clock frequency remains unchanged, even though the performance may increase and may for example double.

The integrated circuit device 24 may operate at unchanged clock rate although the presented data processing circuit may let the comprised combinatorial logic stage 28, which may not receive a clock signal, process data at double the clock rate.

Each period of the clock signal may comprise at least a first and a second clock signal level and each first portion of each of the periods may begin when the clock signal changes from the first to the second clock signal level. And each second portion of each of the periods may begin when the clock signal changes from the second to the first clock signal level.

This may allow using all changes between clock signal levels for triggering data processing by the combinatorial logic circuits 28 of the described data processing circuit 26, 28, 30.

First and second clock signal levels may be different signal levels.

For a square wave clock signal the clock signal changes may correspond to positive or rising edges and, respectively, negative or falling edges of the clock signal (clk) 32.

As shown in FIG. 2, the input stage 26 may comprise a first set of source flip-flop circuits 48 arranged to provide the first set of data signals 34 $SQ_P$ in response to a change of a level of the clock signal (clk) 32 from the first to the second clock signal level, and a second set of source flip-flop circuits 50 arranged to provide the second set of data signals 36 $SQ_N$ in response to a change of a level of the clock signal (clk) 32 from the second to the first clock signal level.

A flip-flop circuit may be any bistable multivibrator circuit. A flip-flop circuit may have two stable states and thereby is capable of serving as one bit of memory. However, other memory circuits or memory devices comprising flip-flop circuits may be used instead. For example, a register may be used.

In the shown embodiment, the first set of source flip-flop circuits 48 may comprise one first source flip-flop circuit and the second set of source flip-flop circuits 50 may comprise one second source flip-flop circuit. The first source flip-flop circuit may be a flip-flop circuit responsive to a positive edge of the clock signal whereas the shown second source flip-flop circuit may receive an inverted clock signal and may respond to a negative edge of the clock signal.

And the input stage 26 may comprises a multiplexer circuit 52 arranged to provide at least the first set of data signals 34 $SQ_P$ during the first portion and the second set of data signals 36 $SQ_N$ during the second portion of the period of the clock signal (clk) 32 to the input 38 of the combinatorial logic stage 28 in response to a selection signal 54 sel.

The shown input stage 26 may be implemented on the integrated circuit die causing only very few increase of die area and only a small increase of power consumption while enabling performance increased usage of the combinatorial logic stage 28, which may require a large portion of die area when compared to the size of input stage 26 and output stage 30.

As shown in FIG. 2, the multiplexer circuit (MUX) 52 may have a plurality of inputs 56, 58 connected to outputs of the source flip-flop circuits 48, 50, an output connected to the input 38 of the combinatorial logic stage 28 and a control input 60 for receiving the selection signal 54 sel for selecting which signal to route to the input 38 of the combinatorial logic stage 28.

The selection signal 54 sel may be the clock signal (clk) 32. This may allow for synchronized pipeline processing of data signals through the data processing circuit 26, 28, 30. In another embodiment, a selection signal different from the clock signal may be applied, for example a filtered clock signal if the clock signal comprises noise or jitter. Or the selection signal may for example be a signal derived from the clock signal, or a signal with a timing similar to that of the clock signal but derived from a different source.

As shown in FIG. 2, the output stage 30 may comprise at least a first 62 and a second 64 destination flip-flop circuit each connected to the output 40 of the combinatorial logic stage 28. The first destination flip-flop circuit 62 may be arranged to receive the first result signal in response to a change of a level of the clock signal (clk) 32 from the first to the second clock signal level and the second destination flip-flop circuit 64 may be arranged to receive the second result signal in response to a change of a level of the clock signal (clk) 32 from the second to the first clock signal level.

In the example embodiment shown in FIG. 2, inputs of a first 62 and a second 64 destination flip-flop circuits are connected to the output 40 of the combinatorial logic stage 28. The first destination flip-flop circuit 62 may receive the clock signal and may respond to a positive edge of the clock signal whereas the second destination flip-flop circuit 64 may receive an inverted clock signal and may respond to a negative edge of the clock signal.

Input stage 26, combinatorial logic stage 28 and output stage 30 may be integrated in the integrated circuit device 24 on a common die. The shown enhanced performance may be available without any dedicated additional connection to external components. However, in another embodiment, the integrated circuit device 24 may allow for enabling and disabling the described logic processing mode.

The integrated circuit device may for example be a very large scale integrated circuit device.

Very-large-scale integration (VLSI) is the process of creating integrated circuits by combining thousands of transistor-based circuits into a single chip. Here, VLSI may refer to any semiconductor integrated circuit having thousands or even millions or billions of transistor-based circuits. Any other naming, such as for example ULSI (ultra large scale integration) suggesting a device to comprise more transistor-based circuits than a VLSI device may be considered a subgroup and comprised in VLSI. Therefore, for example any ULSI device is a VLSI device.

The integrated circuit device 24 may for example be a microprocessor, for example a single core or multi-core microprocessor. A microprocessor may for example be a general purpose processor (GPP), a microcontroller unit (MCU), a central processing unit (CPU), or a graphics processing unit (GPU). Also, the microprocessor may be a digital signal processor (DSP). For example, program address generators in a DSP core may comprise significant area of combinatorial logic circuits.

The integrated circuit device 24 may for example be any circuit which has significant area of combinatorial logic and which is duplicated in the chip. For example, this may refer to an arithmetic logic unit and the microprocessor may comprise an arithmetic logic unit having at least one of the presented data processing circuits.

The integrated circuit device 24 may comprise at least one of the one or more data processing circuits 26, 28, 30 as a part of a data coding unit of the integrated circuit device. A data coding unit may comprise combinatorial logic circuitry and may be used for data encoding or decoding, and may for example be part of a processing engine such as, just to give an example, a dual recursive engine of a Turbo-Viterbi processing engine.

Figure 4:
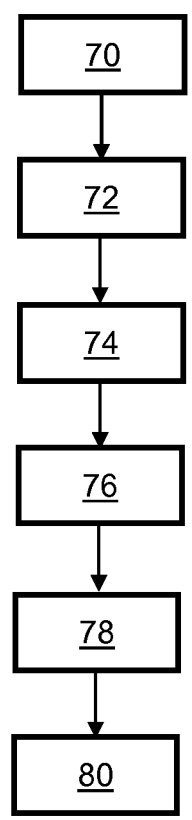
FIG. 4 schematically shows a flow diagram of an example of an embodiment of a method of using combinatorial logic in a data processing circuit.

Referring now to FIG. 4, a schematic flow diagram of an example of an embodiment of a method of using combinatorial logic in a data processing circuit is shown. The illustrated method allows implementing the advantages and characteristics of the described integrated circuit device as part of a method of using combinatorial logic in a data processing circuit comprising an input stage, a combinatorial logic stage, and an output stage. The method may comprise applying 70 at least a first and a second set of data signals to the input stage; applying 72 a clock signal to the input stage and the output stage; in the input stage providing 74 the first set of data signals to an input of the combinatorial logic stage during a first portion of a period of the clock signal and providing 76 the second set of data signals to the input during a second portion of the period; and in the output stage receiving 78 from an output of the combinatorial logic stage at least a first result signal as a function of the first set of data signals during a first portion of a subsequent period of the clock signal and receiving 80 from the output at least a second result signal as a function of the second set of data signals during a second portion of the subsequent period.

The method may comprise that the providing 74 the first set of data signals to an input of the combinatorial logic stage during a first portion of a period of the clock signal and providing 76 the second set of data signals to the input during a second portion of the period comprises providing the first set of data signals when the clock signal changes from a first to a second clock signal level and providing the second set of data signals when the clock signal changes from the second to the first clock signal level.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices.

Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the input stage 26, combinatorial logic stage 28 and output stage 30 may be implemented as a single circuit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the data processing circuit 26, 28, 30 may be integrated on a single die with the integrated circuit device 24. Alternatively, the examples may be implemented as any number of separate integrated circuits or separate devices interconnected with each other in a suitable manner. For example, the data processing circuit may be implemented as a separate device connected to the integrated circuit device.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. An integrated circuit device comprising:
    at least one data processing circuit comprising an input stage, a combinatorial logic stage, and an output stage, wherein
        said input stage is responsive to a clock signal, and arranged to
            receive at least a first set of data signals and a second set of data signals, provide said first set of data signals to an input of said combinatorial logic stage during a first portion of a period of said clock signal, and provide said second set of data signals to said input during a second portion of said period, and said output stage is responsive to said clock signal, and arranged to receive from an output of said combinatorial logic stage at least a first result signal as a function of said first set of data signals during a first portion of a subsequent period of said clock signal, and receive from said output at least a second result signal as a function of said second set of data signals during a second portion of said subsequent period.

2. The integrated circuit device as claimed in claim 1, wherein each period of said clock signal comprises at least a first and a second clock signal level, each first portion of each of said periods begins when said clock signal changes from said first to said second clock signal level, and each second portion of each of said periods begins when said clock signal changes from said second to said first clock signal level.

3. The integrated circuit device as claimed in claim 1, wherein said input stage comprises:

a first set of source flip-flop circuits arranged to provide said first set of data signals in response to a change of a level of said clock signal from said first to said second clock signal level; and a second set of source flip-flop circuits arranged to provide said second set of data signals in response to a change of a level of said clock signal from said second to said first clock signal level.

4. The integrated circuit device as claimed in claim 3, wherein said first set of source flip-flop circuits and said second set of source flip-flop circuits are registers.

5. The integrated circuit device as claimed in claim 1, wherein said input stage comprises:

a multiplexer circuit arranged to provide at least said first set of data signals during said first portion and said second set of data signals during said second portion of said period of said clock signal to said input of said combinatorial logic stage in response to a selection signal.

6. The integrated circuit device as claimed in claim 5, wherein said selection signal is said clock signal.

7. The integrated circuit device as claimed in claim 1, wherein said output stage comprises:

at least a first and a second destination flip-flop circuit each connected to said output of said combinatorial logic stage, wherein said first destination flip-flop circuit is arranged to receive said first result signal in response to a change of a level of said clock signal from said first to said second clock signal level, and said second destination flip-flop circuit is arranged to receive said second result signal in response to a change of a level of said clock signal from said second to said first clock signal level.

8. The integrated circuit device as claimed in claim 7, wherein said first destination flip-flop circuit and said second destination flip-flop circuit are registers.

9. The integrated circuit device as claimed in claim 1, wherein said integrated circuit is a very large scale integrated circuit.

10. The integrated circuit device as claimed in claim 1, wherein said integrated circuit device is a microprocessor.

11. The integrated circuit device as claimed in claim 10, wherein said microprocessor is a digital signal processor.

12. The integrated circuit device as claimed in claim 10, wherein said microprocessor comprises an arithmetic logic unit having at least one of said data processing circuits.

13. The integrated circuit device as claimed in claim 10, wherein said microprocessor is a graphics processing unit.

14. The integrated circuit device as claimed in claim 10, wherein said microprocessor is a multi-core microprocessor.

15. The integrated circuit device as claimed in claim 1, wherein at least one of said at least one data processing circuits is a part of a data coding unit of said integrated circuit device.

16. A method of using combinatorial logic in a data processing circuit comprising an input stage, a combinatorial logic stage, and an output stage, said method comprising:

applying at least a first and a second set of data signals to said input stage;

applying a clock signal to said input stage and said output stage;

providing, in said input stage, said first set of data signals to an input of said combinatorial logic stage during a first portion of a period of said clock signal and providing said second set of data signals to said input during a second portion of said period; and receiving, in said output stage, from an output of said combinatorial logic stage at least a first result signal as a function of said first set of data signals during a first portion of a subsequent period of said clock signal and receiving from said output at least a second result signal as a function of said second set of data signals during a second portion of said subsequent period.

17. The method as claimed in claim 16, wherein said providing said first set of data signals to an input of said combinatorial logic stage during a first portion of a period of said clock signal and providing said second set of data signals to said input during a second portion of said period comprises:

providing said first set of data signals when said clock signal changes from a first to a second clock signal level and providing said second set of data signals when said clock signal changes from said second to said first clock signal level.

18. The method as claimed in claim 16, further comprising:

providing, by a multiplexer circuit of said input stage in response to a selection signal, at least said first set of data signals during said first portion of said period of said, clock signal and said second set of data signals during said second portion of said period to said input of said combinatorial logic stage.

19. The method as claimed in claim 18, wherein said selection signal is said clock signal.

20. The method as claimed in claim 16, further comprising:

receiving said first result signal in response to a change of a level of said clock signal from said first to said second clock signal level, wherein said receiving the first result signal is performed by a first destination flip-flop circuit connected to said output of said combinatorial logic stage; and receiving said second result signal in response to a change of a level of said clock signal from said second to said first clock signal level, wherein said receiving said second result signal is performed by a second destination flip-flop circuit connected to said output of said combinatorial logic stage.

* * * * *